United States Patent [19]

Booher

[11] 4,334,288
[45] Jun. 8, 1982

[54] PRIORITY DETERMINING NETWORK HAVING USER ARBITRATION CIRCUITS COUPLED TO A MULTI-LINE BUS

[76] Inventor: Robert K. Booher, 24001 Muirlands, #395, El Toro, Calif. 92630

[21] Appl. No.: 49,729

[22] Filed: Jun. 18, 1979

[51] Int. Cl.³ .............................................. G06F 9/46
[52] U.S. Cl. ..................................................... 364/900
[58] Field of Search ... 364/200 MS File, 900 MS File; 340/147 LP

[56] References Cited

U.S. PATENT DOCUMENTS

| | | | |
|---|---|---|---|
| 3,425,037 | 1/1969 | Patterson et al. | 364/200 |
| 3,800,287 | 3/1974 | Albright | 364/200 |
| 3,818,447 | 6/1974 | Craft | 364/200 |
| 3,832,689 | 8/1974 | Means et al. | 340/147 LP |
| 3,832,692 | 8/1974 | Henzel et al. | 364/200 |
| 3,866,181 | 2/1975 | Gayman et al. | 364/200 |
| 3,886,524 | 5/1975 | Appelt | 364/200 |
| 3,983,540 | 9/1976 | Keller et al. | 364/200 |
| 3,996,561 | 12/1976 | Kowal et al. | 364/200 |
| 3,997,896 | 12/1976 | Cassarino, Jr. et al. | 364/200 |
| 4,096,569 | 6/1978 | Barlow | 364/200 |
| 4,106,104 | 8/1978 | Nitta et al. | 364/900 |
| 4,148,011 | 4/1979 | McLagan et al. | 364/900 X |
| 4,181,941 | 1/1980 | Godsey | 364/200 |

*Primary Examiner*—Raulfe B. Zache
*Attorney, Agent, or Firm*—Fischer, Tachner & Strauss

[57] ABSTRACT

A priority determining network to concurrently arbitrate between a plurality of requests that are initiated by different users who each desire either access to a system (e.g. a computer, a communication system, or the like) or interruption of transfer of data between certain components (e.g. a memory) that are shared by various facilities of the system. Each user is assigned a respective priority number, the magnitude of which determines the order in which the users gain control of the system. Coded signals which correspond to bits of each user's priority number are stored in respective user register means. Each user has an arbitration circuit that comprises a plurality of serially interconnected arbitration stages, which stages are connected between the user's register means and respective ones of a multi-line bus. The bus lines are common to the arbitration circuits of all competing users. Each arbitration stage is connected to receive one bit of a respective user's priority number. The arbitration circuit of the user having the highest assigned priority number includes gating means which are adapted to drive the multi-line bus to corresponding control signal levels. The arbitration circuits of all unsuccessful competing users include respective gating means that are driven to different signal levels by means of the control signals that are supplied thereto via the common bus lines. Only the arbitration circuit of the user having the highest priority number will be able to generate an output signal that is suitable to enable control of the system to be obtained.

12 Claims, 2 Drawing Figures

Fig. 2

PRIORITY DETERMINING NETWORK HAVING USER ARBITRATION CIRCUITS COUPLED TO A MULTI-LINE BUS

TECHNICAL FIELD

This invention relates to the field of microelectronic circuitry and, more particularly, to circuitry comprising conventional logic means that are uniquely interconnected so as to determine priority of use of a system and its components according to the relative magnitudes of predetermined priority numbers respectively assigned to prospective system users.

BACKGROUND ART

In large systems, such as computer systems, communication systems, and the like, situations arise where some component (e.g. a memory) of the system is shared by many users or facilities of the system. Such a situation requires an arbitration scheme to decide which facility or user receives preferential access to the shared component. Traditionally, conventional priority arbitration schemes have been implemented by circuitry that is adapted to serially propagate a particular signal to all prospective users. Those users who received the signal early in the propagation chain are afforded the highest priority for gaining access to the system and its components. This conventional priority arbitration technique is acceptable from the standpoint of minimizing the number of circuit lines requires to implement the corresponding arbitration circuitry. However, the conventional priority arbitration technique also has several undesirable characteristics. More particularly, the conventional priority arbitration technique is relatively slow. Moreover, the conventional technique undesirably dictates that priority assignments are fixed according to the layout of the wiring that interconnects the components of the system. As an undesirable result, the location of the system components is also dictated, which would both minimize system flexibility and increase space consumption. What is more, if one system component is removed, some provision must be made to reconnect the otherwise interrupted priority chain.

As a consequence of the undesirable characteristics of the aforementioned technique, another priority arbitration scheme evolved. The corresponding priority arbitration circuitry includes separate request lines that are supplied to each prospective user. The shared component chooses which of the user requests is to be granted. This conventional technique, although relatively fast, is relatively expensive to mechanize. Moreover, numerous signal lines are required, which typically increases the overall size of the corresponding priority arbitration circuitry.

Examples of readily available conventional priority arbitration schemes can be found in the following microelectronic chips manufactured by Texas Instruments Corporation: 4-bit Cascadable Priority Register, types SN54278 or SN74278; and the 8-line-to-3-line Priority Encoder, types SN54LS348 or SN74LS348.

SUMMARY OF THE INVENTION

Briefly, and in general terms, a high speed, reliable priority arbitration circuit is disclosed which permits software programmable priority numbers to be assigned to each of a plurality of users or to components of a system (e.g. a computer, or the like). Priority access to the system, in order to affect interruption thereof or transfer of data between certain components of the system that must be shared by various facilities during normal system operation, is accomplished independently from either the location or interconnection scheme of the components.

The binary coded representation of each competing user's assigned priority number is stored in a respective user priority register. During an interval when prospective users selectively initiate respective request input signals, the priority arbitration circuit of the present invention compares, bit by bit, the magnitudes of the priority numbers of each of the competing users, so that the user with the highest assigned number will be awarded priority access to the system and its components. Each of the bits comprising the respective user priority numbers is successively arbitrated (i.e. compared) against one another starting with the most significant bit. During the successive arbitration process, those remaining users whose respective priority numbers are of relatively small magnitude are eventually disabled by the circuit and are, thereby, eliminated from further contention for access to the sytem. The contender with the highest assigned priority number is the only user who is not disabled during the arbitration process. The present priority arbitration circuit includes means by which to provide an indication to the successful user that the magnitude of his assigned priority number is sufficient to gain him priority access to the system and its components at the time during which a request signal is initiated.

ADVANTAGEOUS EFFECTS OF THE INVENTION

The present priority arbitration circuit is capable of high speed operation compared to conventional arbitration schemes.

The present priority arbitration circuit requires relatively few circuit lines to interconnect the various logic stages thereof. Therefore, the preferred circuit and its associated storage register can be implemented on a compact microelectronic chip which, thereby, minimizes space consumption and reduces the cost of fabrication.

The present priority arbitration circuit permits the priority numbers of prospective system users to be software programmable and dynamically assigned.

Moreover, the present priority arbitration circuit provides reliable acknowledgement signals to and identification of the user who has the highest assigned priority number among all those competing users who contend for access to the system during a particular interval of time.

DESCRIPTION OF THE PREFERRED EMBODIMENTS

Figure 1:
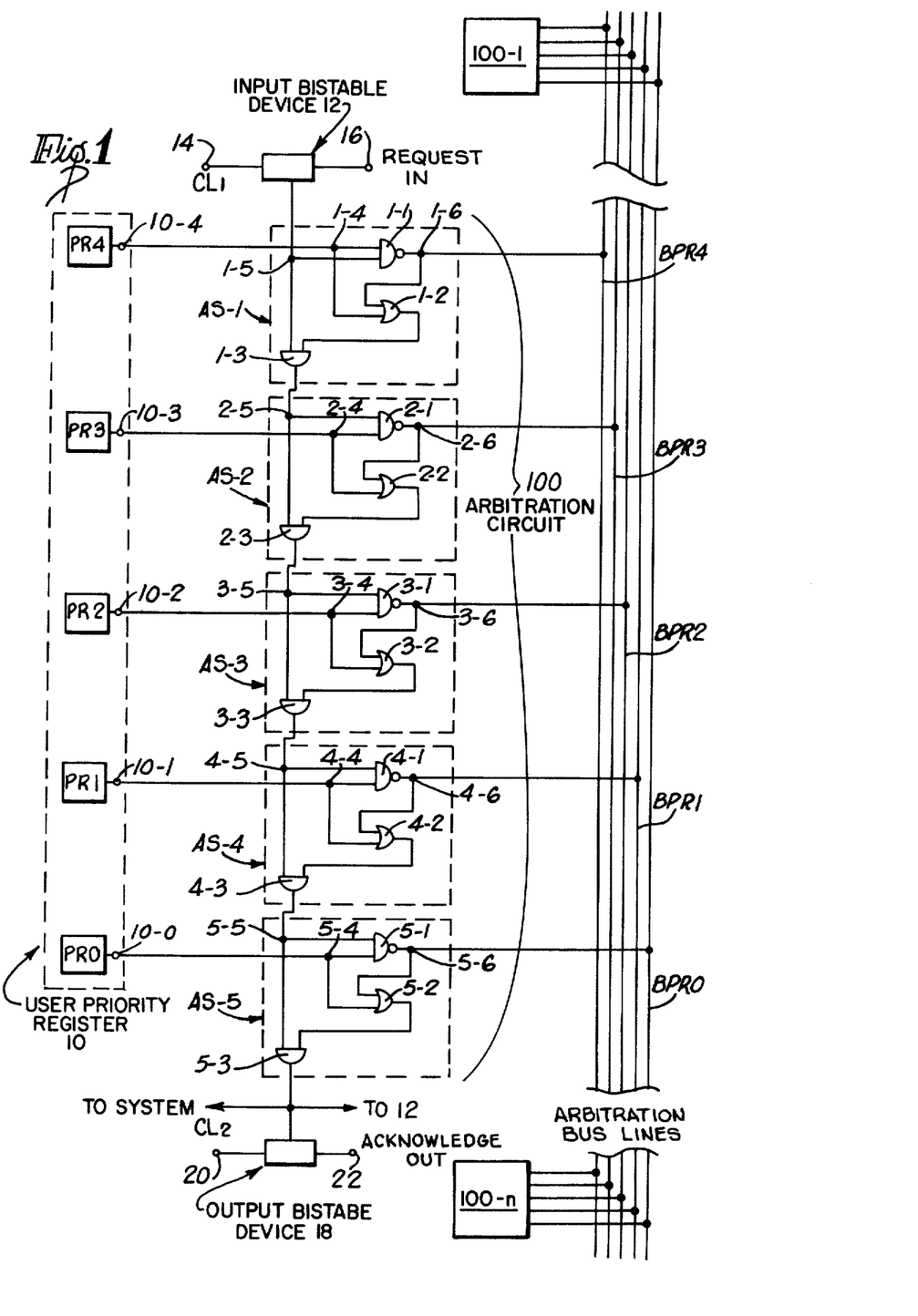
FIG. 1 is a schematic that is illustrative of the logic that is interconnected to form the present priority arbitration circuit, according to one embodiment of the invention.

Referring to FIG. 1 of the drawings, the mechanization of one preferred priority arbitration circuit 100 is illustrated. By way of example, the illustrated arbitration circuit includes five serially connected arbitration stages AS-1, AS-2, AS-3, AS-4, and AS-5. As will be explained in greater detail hereinafter, the arbitration circuit 100 of FIG. 1 can be incorporated in a priority arbitration network in order to concurrently arbitrate as many as $2^5-1$, or 31, request signals from different users who compete for priority access to a system, such as a computer, and the like, or for the transfer of data between or interruption of certain components (e.g. a memory) of the system that must be shared by various facilities (e.g. peripheral units) during normal system operation. (It is assumed that one signal (e.g. 00000) is needed to indicate that no user is desirous of access to the system at a particular time). It is to be understood, however, that the number of illustrated arbitration stages that form the priority circuit 100 of FIG. 1 is not to be considered a limitation of the present invention. Any suitable number of arbitration stages may be interconnected with one another to form the priority circuit 100. Moreover, the number of arbitration circuits designated 100-1, . . . , 100-$n$ that may be included in a priority arbitration network is typically dependent upon the number of system users and components of the system which are to be shared. For purposes of economy and convenience, only one priority arbitration circuit 100 is detailed in the drawings and described below.

Each priority arbitration circuit 100 interfaces with a respective user priority register 10 and a set of arbitration bus lines. User priority register 10 includes a plurality (e.g. five) of means PR4, PR3, PR2, PR1 and PR0 that can be software programmed to collectively store the representation of a particular, predetermined priority number that is assigned to a prospective system user. By way of example, each of the plurality of priority assignment means PR4, . . . , PR0 of register 10 may comprise either of a data latch or an edge triggered flip-flop, which means provides the system with an ability to dynamically assign (i.e. automatically change or reorder) a user's priority number during normal system operation. However, in less demanding systems, each of the priority assignment means PR4, . . . , PR0 of register 10 may comprise a mechanical switch or a hard wired connection. An output terminal 10-4, . . . , 10-0 form each of a priority assignment means PR4, . . . , PR0 is respectively connected to an input terminal of a corresponding one of the arbitration stages AS-1, . . . , AS-5 that forms the arbitration circuit 100 of FIG. 1.

Each of the plurality of priority assignment means PR4, . . . , PR0 of user priority register 10 is conditioned to represent a respective bit of the binary coded representation of a user's predetermined priority number. That is, priority assignment means PR4 is conditioned (i.e. programmed, set, hard wired, etc.) to provide a logic level signal at the output terminal 10-4 thereof in order to represent the most significant bit of a user's binary coded priority number. Priority assignment means PR0 is conditioned to provide a logic level signal at the output terminal 10-0 thereof in order to represent the least significant bit of a user's binary coded priority number. Typically, the storage of a high binary coded priority number in register 10 is indicative of a high priority system user.

By way of example, the logic level output signals that are generated by user priority register 10 may be TTL compatible. More particularly, any priority assignment means PR4, . . . , PR0 that supply true logic level or relatively positive voltage signals (e.g. +V) at the output terminals thereof are respectively conditioned to represent a binary 1. Any other priority assignment means PR4, . . . , PR0 that supply false logic level or relatively negative voltage signals (e.g. ground) at the output terminals thereof are respectively conditioned to represent a binary 0.

An output terminal of each of the arbitration stages AS-1 . . . , AS-5 that form arbitration circuit 100 is connected to a respective arbitration bus line BPR4, BPR3, BPR2, BPR1, and BPR0. Bus lines BPR4, . . . , BPR0 may be common to each of the system users and to designated system components that are shared among the users. Therefore, each user of the system is provided with an opportunity to contend with other prospective users via common arbitration bus lines BPR4, . . . , BPR0 (in a manner to be more fully described hereinafter) to compete for access to or for interruption of the system. The magnitude of his assigned priority number determines a user's chances for prevailing over all of those competitors who contend for the system at the same time.

Each of the arbitration stages AS-1, . . . , AS-5 that forms priority arbitration circuit 100 of FIG. 1 is identically implemented by the interconnection of three conventional and readily available logic gates: A 2-input positive NAND buffer gate with an open collector output terminal (which output terminal is adapted to be driven to a true logic level signal by means of a suitable pullup resistor); a 2-input positive OR gate; and a 2-input positive AND gate. The logic of priority arbitration circuit 100 is selected so as to be capable of both receiving and supplying logic level signals that are TTL compatible. The various voltages that correspond to the logic levels of a TTL scheme were previously described when referring to the user priority register 10, above.

Since, as previously disclosed, each of the stages of priority arbitration circuit 100 is implemented in an identical fashion, only arbitration stages AS-1 and AS-2 are described in detail. According to a first embodiment of the invention and referring initially to the highest order, a first arbitration stage AS-1, one input terminal of a NAND gate 1-1 is connected at a common electrical junction 1-4 with one input terminal of an OR gate 1-2 and the output terminal 10-4 of the priority assignment means PR4 that is indicative of the most significant bit of the priority number stored in register 10. The second input terminal of NAND gate 1-1 is connected at a common electrical junction 1-5 with one input terminal of an AND gate 1-3. The output terminal of NAND gate 1-1 is connected at a common electrical junction 1-6 with the second input terminal of OR gate 1-2 and a first respective arbitration bus line BPR4. The output terminal of OR gate 1-2 is connected to the second input terminal of AND gate 1-3.

The output terminal of AND gate 1-3 is connected to the succeeding priority arbitration stage AS-2 at a common electrical junction 2-5 with one input terminal of each of a NAND gate 2-1 and an AND gate 2-3. The second input terminal of NAND gate 2-1 is connected at a common electrical junction 2-4 with one input terminal of an OR gate 2-2 and the output terminal 10-3 of the priority assignment means PR3 that is indicative of the second most significant bit of the priority number stored in register 10. The output terminal of NAND gate 2-1 is connected at a common electrical junction 2-6 with the second input terminal of OR gate 2-2 and a second respective arbitration bus line BPR3. The output terminal of OR gate 2-2 is connected to the second input terminal of AND gate 2-3. The output terminal of AND gate 2-3 is connected to the next succeeding arbitration stage AS-3 in a similar manner to that described immediately above. It is therefore believed that the connections of the NAND, OR and AND gates to form the remaining priority arbitration stages AS-3, ..., AS-5 and the interconnections of these stages with the arbitration bus lines BPR2, ..., BPR0 and the output terminals of those priority assignment means PR2, ..., PR0 that are indicative of the least significant bits of the user priority number stored in register 10 will be apparent to those skilled in the art.

A priority arbitration network, in which the priority, arbitration circuit 100 of FIG. 1 may be incorporated, is synchronously controlled, inasmuch as all prospective system users are required to initiate their requests concurrently for access to or for interruption of the system and its components. In order to synchronously control the respective arbitration circuit 100 of a system user, the output terminal of an input bistable device 12 is connected to the first arbitration stage AS-1 at the common electrical junction 1-5 thereof. By way of example, input bistable device 12 may comprise a conventional edge triggered flip-flop. One input terminal 14 of each user's input flip-flop 12 is connected to receive a recurring clock signal, designated $CL_1$. Another input terminal 16 of flip-flop 12 is connected to receive the user's request signal, designated REQUEST IN, when access to the system is desired. One of the transitions (either a positive or negative going edge) of the recurring clock signal $CL_1$ at the input terminal 16 of each prospective user's flip-flop 12 synchronizes the respective REQUEST IN signals of all of those competing for the system.

The output terminal of the last arbitration stage of each priority circuit 100 is connected to an input terminal of a respective output bistable device 18, such as a latch, an edge triggered flip-flop, or the like. Therefore, the output terminal of the AND gate 5-3 that forms the fifth arbitration stage AS-5 in FIG. 1 is connected to one input terminal of output flip-flop 18. Another input terminal 20 of each user's output flip-flop 18 is connected to receive a recurring clock signal $CL_2$. The clock signals $CL_1$ and $CL_2$ are synchronized with one another, so that an input flip-flop 12 cannot respond to a new REQUEST IN signal until a suitable amount of time has elapsed, during which time a sufficient delay is provided in order that a previous REQUEST IN signal can be completely gated through the logic of each arbitration stage AS-1, ..., AS-5. In addition, the delay permits the components that form the logic of priority circuit 100 to return to their initial operating conditions (i.e. voltages). For example, if input flip-flop is triggered by the leading edge of a particular recurring clock signal, then output flip-flop 18 could be triggered by either the next leading edge of the clock signal or by the trailing edge thereof (or vice versa) so as to prevent any of the competing users from initiating subsequent REQUEST IN signals until the desired time has elapsed for circuit 100 to stabilize. Therefore, clock signal $CL_1$ and $CL_2$ may be the same or different clock signals, but the interval between their respective activation times must be sufficiently long to permit time for the aforementioned synchronization and stabilization to occur within the priority arbitration network. If the $CL_1$ and $CL_2$ clock signals are identical, the signal generated at the output terminal of AND gate 5-3 can be fed back to input flip-flop 12 to control (i.e. turn off) the REQUEST IN signal thereat after priority access to or interruption of the system has been successfully achieved.

Output flip-flop 18 is set by the output voltage signal of AND gate 5-3, so that flip-flop 18 stores a binary representation of the corresponding logic level thereof. Accordingly, during the presence of the $CL_2$ clock signal at input terminal 20, the voltage level of the signal, designated ACKNOWLEDGE OUT, at an output terminal 22 of output flip-flop 18 can activate a well known display device (not shown) and, thereby, provide the user with an indication whether or not the magnitude of his assigned priority number has gained him access to or interruption of the system.

The operation of the priority arbitration circuit 100 of FIG. 1 is now disclosed. A user who wishes to compete for priority access to the system selectively initiates a REQUEST IN signal, whereby a relatively positive voltage or true logic signal is applied to one input terminal 16 of input flip-flop 12. The REQUEST IN signal generated by the user is synchronized with those of all other competing users by the occurrence of the $CL_1$ clock signal at the input terminal 14 of each prospective user's input flip-flop 12. During that interval of time in which the REQUEST IN signals of all competing users are synchronized with one another, the output terminal of each respective input flip-flop 12 is driven to a relatively positive voltage or true logic level signal. Hence, the true logic signal is applied to each competing user's first priority arbitration stage AS-1, via common electrical junction 1-5, at one input terminal of each of NAND gate 1-1 and AND gate 1-3.

By way of a first example, it is assumed that at least one user has a coded priority number stored in the priority assignment means PR4, ..., PR0 of his respective priority register 10, the most significant bit of which is a binary 1. Therefore, a true logic level signal (corresponding to a binary 1) is supplied from the output terminal 10-4 of the at least one user's priority assignment means PR4 to each of the second input terminal of NAND gate 1-1 and one input terminal of OR gate 1-2.

In the first example, the output terminal of NAND gate 1-1 is driven to a relatively negative voltage (i.e. ground) or a false logic level signal, inasmuch as each of the input terminals of NAND gate 1-1 is respectively driven to a true logic level signal, as previously disclosed. As a result, common electrical junction 1-6 and each of common arbitration bus line BPR4 and the second input terminal of OR gate 1-2 is clamped to ground and to a false logic level signal via the output terminal of NAND gate 1-1. The output terminal of OR gate 1-2 is driven to a relatively positive voltage and to a true logic signal, inasmuch as at least one input terminal thereof (i.e. that connected to common electrical junction 1-4) receives a true logic level signal. The true logic level signal at the output terminal of OR gate 1-2 is applied to the second input terminal of AND gate 1-3. As a result, during the first example, the output terminal of the AND gate 1-3 of the at least one user having a binary 1 as the most significant bit of his stored priority number is also driven to a true logic level signal (i.e. representative of the output signal of first arbitration stage AS-1), inasmuch as each one of the input terminals thereof is respectively driven to a true logic level signal.

Accordingly, a true logic level signal is applied from the output terminal of AND gate 1-3, via common electrical junction 2-5, to the succeeding or second, arbitration stage AS-2 at one input terminal of each of NAND gate 2-1 and AND gate 2-3. Thus, NAND gate 2-3 of second arbitration stage AS-2 is adapted to gate the output signal of the preceding, or first, arbitration stage AS-1 with the signal (corresponding to the second most significant bit of the user's coded priority number) stored in the priority assignment means PR3 of a contending user's respective priority register 10. The aforementioned gating of the two last-mentioned signals is accomplished according to either the sequence described in the example above or to that to be described in the example below, depending upon the logic level of the signal stored by priority assignment means PR3.

During this first example, any other competitor having a coded priority number, the most significant bit of which is a binary 0, is eliminated from further contention for the system. More particularly, and in order to eliminate a user of lower priority, a false logic level signal (corresponding to a binary 0) is applied from the output terminal 10-4 of each of the other competitor's respective priority assignment means PR4, via common electrical junction 1-4, to one input terminal of each of NAND gate 1-1 and OR gate 1-2 of their respective first arbitration stage AS-1. However, the second input terminal of OR gate 1-2 is clamped to ground (and to a false logic level signal) via common electrical junction 1-6, common arbitration bus line BPR4, and the output terminal of NAND gate 1-1 of the at least one competitor having a coded priority number, the most significant bit of which is a binary 1 (as previously disclosed). Therefore, each of the output terminal of OR gate 1-2 and one input terminal of AND gate 1-3 is driven to a false logic level signal, inasmuch as each of the input terminals of OR gate 1-2 is respectively driven to a false logic level signal. As a result, the output terminal of the AND gate 1-3 of every user having a binary 0 as the most significant bit of his stored priority number is also driven to a false logic level signals, inasmuch as at least one input terminal thereof (i.e. that connected to the output terminal of OR gate 1-2) is driven to a false logic level signal.

The false logic level signal at the output terminal of a last mentioned other competitor's AND gate 1-3 (i.e. representative of the output signal of first arbitration stage AS-1) is applied, via common electrical junction 2-5, to the succeeding, or second, priority arbitration stage AS-2 at one input terminal of each of AND gate 2-3 and NAND gate 2-1. As can be appreciated by those skilled in the art, the respective output terminals of each of the AND gates 2-3, . . . , 5-3 of the remaining lower order arbitration stages AS-2, . . . , AS-5 are also driven to a false logic level signal, inasmuch as, during this example, at least one input terminal thereof (i.e. that connected to the output terminal of the AND gate of the preceding arbitration stage) receives a false logic level signal. The AND gate 5-3 of the last arbitration stage AS-5 of the present priority arbitration circuit 100 thereby supplies one input terminal of output flip-flop 18 with a false logic level signal. When the CL$_2$ clock signal is present at the other input terminal 20 of output flip-flop 18, the output terminal 22 thereof is, accordingly, driven to a corresponding false logic level signal, ACKNOWLEDGE OUT, the voltage level of which is suitable to provide the particular user with the information that his assigned priority number is not sufficiently high enough to gain him access to or interruption of the system at the present time.

In a second example, if every competitor has a coded priority number, the most significant bit of which is a binary 0, then no prospective user is eliminated from contention for the system by the first arbitration stage AS-1. In this second example, a false logic level signal (corresponding to a binary 0) is applied from the output terminal 10-4 of every contending user's priority assignment means PR4, via common electrical junction 1-4, to a respective first arbitration stage AS-1 at one input terminal of each of NAND gate 1-1 and OR gate 1-2 thereof. However, in this second example, the output terminal of a user's respective arbitration stage NAND gate 1-1 is driven to a true logic level signal, inasmuch as at least one input terminal thereof (i.e. that connected to priority assignment means PR4) is driven to a false logic level signal and, unlike the example described immediately above, the output terminal thereof is not clamped to ground. As a result, the output terminal of OR gate 1-2 is driven to a true logic level signal, inasmuch as at least one input terminal thereof (i.e., that connected to the output terminal of NAND gate 1-1 via common electrical junction 1-6) receives a true logic level signal. The true logic level signal at the output terminal of OR gate 1-2 is applied to one input terminal of AND gate 1-3. At the same time, a true logic level signal is also applied to the second input terminal of AND gate 1-3 via common electrical junction 1-5 and an output terminal of input flip-flop 12. Therefore, during the second example, the respective output terminal of the AND gate 1-3 of every competing user is driven to a true logic level signal (i.e. representative of the output signal of first arbitration stage AS-1), inasmuch as each of the input terminals thereof is respectively driven to a true logic level signal.

Accordingly, a true logic level signal is applied from the output terminal of AND gate 1-3, via common electrical junction 2-5, to the succeeding, or second, arbitration stage AS-2 at one input terminal of each of NAND gate 2-1 and AND gate 2-3. Thus, NAND gate 2-3 of second arbitration stage AS-2 is adapted to gate the output signal of the preceding arbitration stage AS-1 with the signal (at the output terminal 10-3 of priority assignment means PR3) that corresponds to the second most significant bit of the user's coded priority number.

It will be understood by those skilled in the art that each of the bits comprising the binary coded priority numbers of all of those users who compete for access to the system are successively arbitrated by respective priority arbitration stage AS-5, . . . , AS-1 of the present priority arbitration circuit 100. Contending users whose respective priority numbers are of a relatively low magnitude are typically disabled by one of the higher order arbitration stages (e.g. AS-1 or AS-2), whereupon the output terminal of the respective NAND gate 1-1 or 2-1 thereof is clamped to a false logic level signal via common arbitration bus line BPR4 or BPR3. The logic levels of the output signals from the OR and AND gates of each arbitration stage determine those priority numbers which do not disable a prospective user. Therefore, when the output terminal of a priority stage AND gate is driven to a true logic level signal, the arbitration process for that prospective user is repeated, with all remaining contenders, by a successively lower order arbitration stage (e.g. AS-3, . . . , AS-5) via respective common arbitration bus lines BPR2, . . . , BPR0.

The particular user having the highest binary coded priority number stored in his priority register 10 during an interval in which system access is requested will be the only contender who is capable of causing each of the respective output terminals of the AND gates 1-3, .

..., 5-3 that form successively lower order arbitration stages AS-1, ..., AS-5 to be driven to a true logic level signal. As a result, a true logic level signal is applied to both the system to be continued and to one input terminal of the successful user's output flip-flop 18 from the output terminal of the AND gate 5-3 that forms the last (i.e. lowest order) arbitration stage AS-5. Accordingly, during that time when the $CL_2$ clock signal is present at the other input terminal 20 of flip-flop 18, the output terminal 22 thereof is driven to a true logic level signal, ACKNOWLEDGE OUT, the voltage level of which is suitable to provide the successful user with the information that his assigned priority number is high enough to gain him the desired access to or interruption of the system at the present time.

Figure 2:
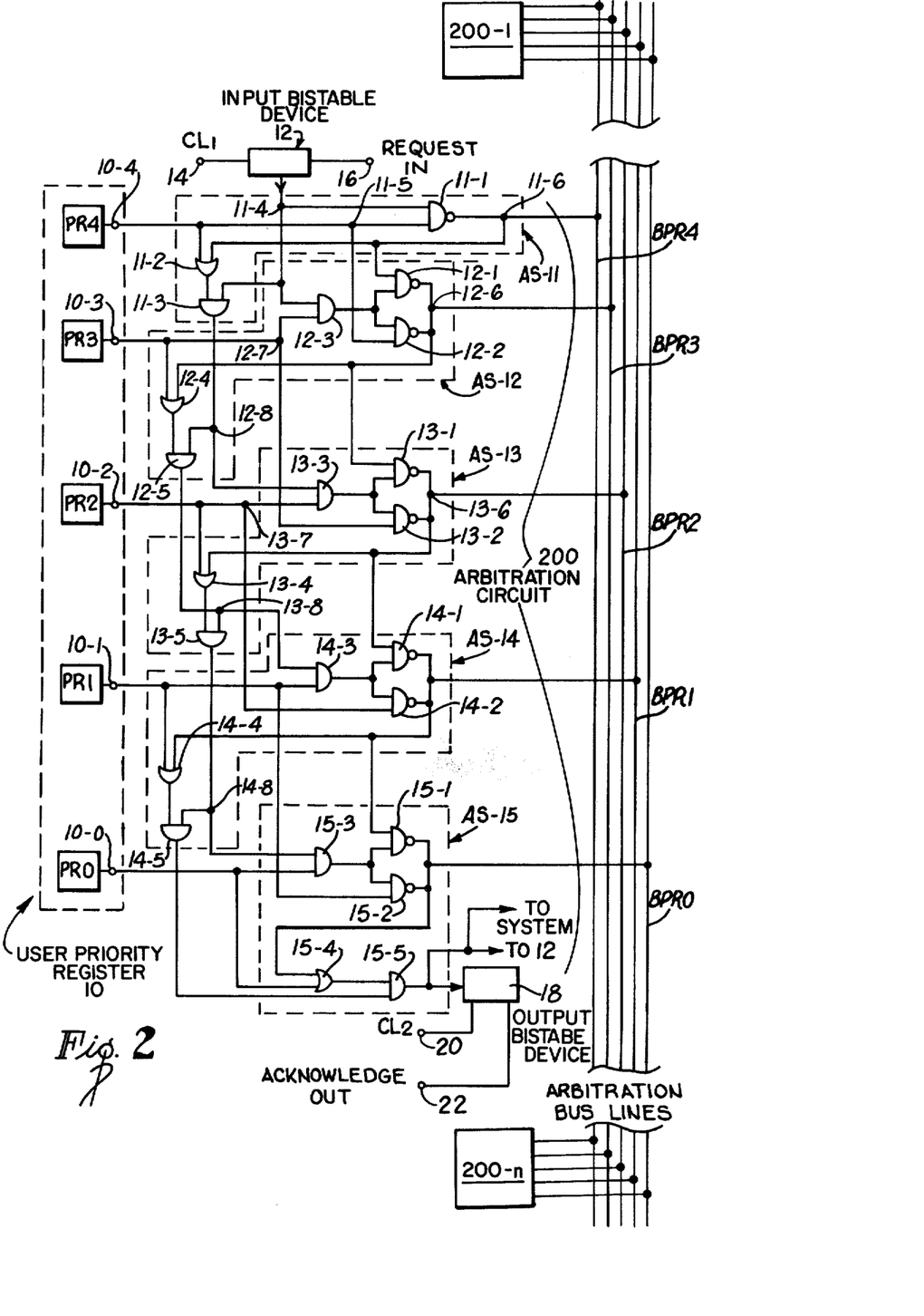
FIG. 2 is a schematic that is illustrative of the logic that is interconnected to form the present priority arbitration circuit, according to a second embodiment of the invention.

Referring now to FIG. 2 of the drawings, the mechanization of a second preferred priority arbitration circuit 200 is illustrated. By way of example, the illustrated arbitration circuit 200 includes a plurality of (five) interconnected arbitration stages AS-11, AS-12, AS-13, AS-14, and AS-15. However, it is to be understood that any suitable number of arbitration stages may be interconnected with one another to form the priority circuit 200. Moreover, any number of circuits 200-1, ..., 200-n can be interconnected to form a priority determining network.

Similar to that disclosed when referring to the priority arbitration circuit 100 of FIG. 1, each priority arbitration circuit 200 of FIG. 2 interfaces with a respective user priority register 10 and a set of arbitration bus lines BPR4, BPR3, BPR2, BPR1, and BPR0. The user priority register and arbitration bus lines of FIG. 2 may be identical to those illustrated in FIG. 1. Therefore, for purposes of convenience, the priority register 10 and bus lines BPR4, ..., BPR0 of FIG. 2 will not be described again, and the same reference numerals are used in FIG. 2 as were previously used in the description thereof in FIG. 1. Moreover, the priority assignment means PR4, PR3, PR2, PR1, and PR0 that form priority register 10 of FIG. 2 and store the respective bits of the binary coded representation of a user's assigned priority number may also be identical to the priority assignment means previously disclosed when referring to FIG. 1.

The number of logic gates that form each of the arbitration stages AS-12, ..., AS-15 of circuit 200 is the same. More particularly, each of arbitration stages AS-12, ..., AS-15 is identically formed and includes two 2-input positive NAND buffer gates with respective open collector output terminals, one 2-input positive OR gate, and two 2-input positive AND gates. However, to increase the speed of priority arbitration circuit 200, the first arbitration stage AS-11 is mechanized with fewer logic gates than those used to mechanize any of the succeeding arbitration stages AS-12, ..., AS-15. More particularly, first arbitration stage AS-11 includes a 2-input positive NAND buffer gate with an open collector output terminal, a 2-input positive OR gate, and a 2-input positive AND gate. First arbitration stage AS-11 comprises a fewer number of gates, because, as will be understood by those skilled in the art, unlike the logic performed by the combination of the two NAND gates that form respective arbitration stages AS-12, ..., AS-15, the NAND gate that forms first arbitration stage AS-11 does not perform a logical OR operation. As will also be recognized, first arbitration stage AS-11 of priority arbitration circuit 200 is mechanized in an identical fashion to the mechanization of each of the arbitration stages that forms priority arbitration circuit 100 of FIG. 1.

Priority arbitration circuit 200 includes respective input bistable means 12 and output bistable means 18, such as flip-flops, latches, or the like (which bistable means may be identical to those disclosed when referring to FIG. 1). Therefore, one input terminal 14 of each user's input flip-flop is connected to receive the recurring clock signal $CL_1$. Another input terminal 16 of flip-flop 12 is connected to receive the user's request signal REQUEST IN, when access to the system is selectively desired. An output terminal of flip-flop 12 is connected to first arbitration stage AS-11. Moreover, the output terminal of the last (i.e. fifth) arbitration stage AS-15 is connected to one input terminal of output flip-flop 18. Another input terminal 20 of each user's output flip-flop 18 is connected to receive the recurring clock signal $CL_2$. As previously disclosed when referring to FIG. 1, the clock signals $CL_1$ and $CL_2$ are synchronized with one another and may be the same or different clock signals.

According to a second embodiment of the present invention and referring initially to the highest order, or first, arbitration stage AS-11, the output terminal of input flip-flop 12 is connected to arbitration stage AS-11 at a common electrical junction 11-4 with one input terminal of each of a NAND gate 11-1, an AND gate 11-3, and an AND gate 12-3 of the second arbitration stage AS-12. The second input terminal of NAND gate 11-1 is connected at a common electrical junction 11-5 with one input terminal of an OR gate 11-2, the output terminal 10-4 of the priority assignment means PR4 that is conditioned to represent the most significant bit of a respective user's assigned priority number, and an input terminal of a NAND gate 12-2 that forms the second arbitration stage AS-12. The output terminal of NAND gate 11-1 is connected at a common electrical junction 11-6 with the second input terminal of OR gate 11-2, a first arbitration bus line BPR4, and an input terminal of another NAND gate 12-1 that forms second arbitration stage AS-12. The output terminal of OR gate 11-2 is connected to the second input terminal of AND gate 11-3. The output terminal of AND gate 11-3 (i.e. the output terminal of first arbitration stage AS-11) is connected to one input terminal of each of AND gates 12-5 and 13-3 that form the second and third arbitration stages AS-12 and AS-13, respectively.

The second arbitration stage AS-12 of priority arbitration circuit 200 is now described in detail. Second input terminals of each of NAND gates 21-1 and 12-2 are connected together at a common electrical junction with the output terminal of AND gate 12-3. The output terminals of each of NAND gates 12-1 and 12-2 are connected together at a common electrical junction 12-6 with one input terminal of OR gate 12-4, a second arbitration bus line BPR3, and one input terminal of a NAND gate 13-1 that forms the succeeding, or third, arbitration stage AS-13, whereby NAND gates 12-1 and 12-2 are interconnected to operate in parallel with one another. The output terminal 10-3 of the priority assignment means PR3 that is continued to represent the second most significant bit of a respective user's assigned priority number is connected at a common electrical junction 12-7 with the second input terminal of each of OR gate 12-4 and AND gate 12-3 and one input terminal of another NAND gate 13-2 that forms the succeeding, or third, arbitration stage AS-13. The second input terminal of AND gate 12-5 is connected to the output terminal of OR gate 12-4. The output terminal of AND gate 12-5 (representative of the output terminal of second arbitration stage AS-12) is connected at a common electrical junction 13-8 with one input terminal of each of AND gates 13-5 and 14-3 that form the immediately succeeding, or third, arbitration stage AS-13 and the second succeeding, or fourth, arbitration stage AS-14, respectively.

The third arbitration stage AS-13 of priority arbitration circuit 200 is now described in detail. Second input terminals of each of NAND gates 13-1 and 13-2 are connected together at a common electrical junction with the output terminal of AND gate 13-3. The output terminals of each of NAND gates 13-1 and 13-2 are connected together at a common electrical junction 13-6 with one input terminal of an OR gate 13-4, a third arbitration bus line BPR2, and one input terminal of a NAND gate 14-1 that forms the succeeding, or fourth, arbitration stage AS-14, whereby NAND gates 13-1 and 13-2 are interconnected to operate in parallel with one another. The output terminal 10-2 of the priority assignment means PR2 that is conditioned to represent the third most significant bit of a respective user's assigned priority number is connected at a common electrical junction 13-7 with the second input terminal of each of OR gate 13-4 and AND gate 13-3 and one input terminal of another NAND gate 14-2 that forms the succeeding, or fourth, arbitration stage AS-14. The second input terminal of AND gate 13-5 is connected to the output terminal of OR gate 13-4. The output terminal of AND gate 13-5 (representative of the output terminal of third arbitration stage AS-13) is connected at a common electrical junction 14-8 with one input terminal of each of AND gates 14-5 and 15-3 that form the immediately succeeding, or fourth, arbitration stage AS-14 and the second succeeding, or fifth, arbitration stage AS-15, respectively. Inasmuch as each of the lowest order, or fourth and fifth, arbitration stages AS-14 and AS-15 is formed identically to both of the previously described arbitration stages AS-12 and AS-13, it is believed that the mechanizations of stages AS-14 and AS-15 will be apparent to those skilled in the art.

The operation of the priority arbitration circuit 200 of FIG. 2 is now disclosed. As was previously described when referring to FIG. 1, a user who wishes to compete for priority access to a system selectively initiates a REQUEST IN signal, whereby a relatively true logic level is applied to one input terminal 16 of input flip-flop 12. During the presence of the $CL_1$ clock signal at the other input terminal 14 of each competing user's flip-flop 12, the output terminal of that flip-flop 12 supplies a true logic level signal to the user's first priority arbitration stage AS-11 at common electrical junction 11-4. Inasmuch as first arbitration stage AS-11 of priority arbitration circuit 200 performs logic in a substantially identical fashion to that performed by arbitration stage AS-1 of priority arbitration circuit 100, the operation of first arbitration stage AS-11 will not be described herein. Therefore, the operation of second arbitration stage AS-12 will now be described in detail.

By way of a first example, it is assumed that at least one user has a coded priority number stored in the priority assignment means PR4, . . . , PR0 of his respective priority register 10, the two most significant bits of which are each a binary 1. Therefore, as disclosed when referring to FIG. 1, the output terminal 10-4 of the at least one user's priority assignment means 10-4 receives a true logic level signal, while the output terminal of NAND gate 11-1 (as well as common electrical junction 11-6 and common arbitration bus line BPR4) is driven to a false logic level signal. Additionally, a true logic level signal (corresponding to a binary 1) is applied to the output terminal 10-3 of that user's priority assignment means PR3. The output terminal of second arbitration stage AND gate 12-3 is also driven to a true logic level signal, inasmuch as each one of the input terminals thereof is respectively connected to receive a true logic level signal. Hence, one input terminal of each of NAND gates 12-1 and 12-2 are connected to receive a true logic level signal from the output terminal of AND gate 12-3. The second input terminal of NAND gate 12-2 is connected to receive a true logic level signal from the output terminal 10-4 of priority assignment means PR4 at common electrical junction 11-4. Therefore, the output terminal of NAND gate 12-2 is driven to a false logic level signal, inasmuch as each of the input terminals thereof is respectively driven to a true logic level signal. As a result, during this first example, common electrical junction 12-6, and each of common arbitration bus line BPR3, one input terminal of OR gate 12-4 and one input terminal of the succeeding, or third, arbitration stage NAND gate 13-1 are clamped to ground and to a false logic level signal via the output terminal of the respective NAND gate 12-2 of the aforementioned at least one user.

Also during this first example, the second input terminal of OR gate 12-4 is connected to receive a true logic level signal from the output terminal 10-3 of priority assignment means PR3 at common electrical junction 12-7. As a result, the output terminal of OR gate 12-4 is driven to a true logic level signal, inasmuch as at least one input terminal thereof is driven to a true logic level signal. One input terminal of AND gate 12-5 is connected to receive the true logic level signal from the output terminal of OR gate 12-4. The second input terminal of AND gate 12-5 is connected to receive a true logic level signal from the output terminal of the first arbitration stage AS-11 (i.e. at the output terminal of AND gate 11-3) via common electrical junction 12-8. Accordingly, during this first example, the output terminal of second arbitration stage AND gate 12-5 of the at least one user having an assigned priority number, the two most significant bits of which are each a binary 1, is also driven to a true logic level signal (representative of the output signal of second arbitration stage AS-12), inasmuch as each one of the input terminals of AND gate 12-5 is respectively driven to a true logic level signal.

During this first example, any other competitor having a coded priority number, the two most significant bits of which are a binary 1 and 0, respectively, is eliminated from further contention for the system at his second arbitration stage AS-12. More particularly, and in order to eliminate a user of lower priority, a false logic level signal (corresponding to a binary 0) is applied from the output terminal 10-3 of each of said other competitor's respective priority assignment means PR3, via common electrical junction 12-7, to one input terminal of each of AND gate 12-3 and OR gate 12-4 of a corresponding second arbitration stage AS-12. However, during this first example, the second input terminal of each relatively low priority user's OR gate 12-4 is clamped to ground (and to a false logic level signal) via common electrical junction 12-6, common arbitration bus line BPR3, and, as described above, the output terminal of the NAND gate 12-2 of the at least one competitor having a coded priority number, the two most significant bits of which are each a binary 1. Therefore, each of the output terminal of OR gate 12-4 and one input terminal of AND gate 12-5 is driven to a false logic level signal, inasmuch as each of the input terminals of OR gate 12-4 is respectively driven to a false logic level signal. As a result, in the first example, the output terminal of the second arbitration stage AND gate 12-5 of every other user having an assigned priority number, the two most significant bits of which are a binary 1 and 0, respectively, is also driven to a false logic level signal, inasmuch as at least one input terminal thereof (i.e. that connected to the output terminal of OR gate 12-4) is driven to a false logic level signal.

As will be appreciated by those skilled in the art, the respective output terminals of each of the AND gates 13-5, . . . , 15-5 of the remaining lower order arbitration stages AS-13, . . . , AS-15 are also driven to a false logic level signal, inasmuch as, during this first example, at least one input terminal thereof (i.e. that connected to the output terminal of the AND gate of the preceding arbitration stage) receives a false logic level signal. The AND gate 15-5 of the last arbitration stage AS-15 of the present priority arbitration circuit 200 thereby supplied one input terminal of output-flip-flop 18 with a false logic level signal. When the $CL_2$ clock signal is present at the other input terminal 20 of output flip-flop 18, the output terminal 22 thereof is, accordingly, driven to a corresponding false logic level signal, ACKNOWLEDGE OUT, the voltage level of which is suitable to provide the particular user with the information that his assigned priority number is not sufficiently high enough to gain him access to or interruption of the system at the present time.

In a second example, if every competitor has a coded priority number, the two most significant bits of which are a binary 1 and 0, respectively, then no prospective user is eliminated from contention for the system at his second arbitration stage AS-12. In this second example, a false logic level signal (corresponding to a binary 0) is applied from the output terminal 10-3 of every contending user's priority arbitration means PR3, via common electrical junction 12-7, to a corresponding second arbitration stage AS-12 at one input terminal of each of AND gate 12-3 and OR gate 12-4. The output terminal of AND gate 12-3 is driven to a false logic level signal, inasmuch as at least one input terminal thereof receives a false logic level signal. Therefore, one input terminal of each of NAND gates 12-1 and 12-2 receives a false logic level signal from the output terminal of AND gate 12-3. However, in this second example, the respective output terminals of NAND gates 12-1 and 12-2 are driven to a true logic level signal, inasmuch as at least one input terminal thereof is driven to a false logic level signal and, unlike the example described immediately above, the respective output terminals thereof are no longer clamped to ground. As a result, the output terminal of every competitor's OR gate 12-4 is driven to a true logic level signal, inasmuch as at least one input terminal thereof (i.e. that connected to common electrical junction 12-6) receives a true logic level signal. One input terminal of AND gate 12-5 receives a true logic level signal from the output terminal of OR gate 12-4. The second input terminal of AND gate 12-5 also receives a true logic level signal from the output terminal of the preceding, or first, arbitration stage AS-11 (at the output terminal of AND gate 11-3) via common electrical junction 12-8. Therefore, during the second example, the respective output terminal of the AND gate 12-5 of every competing user (each of which users having an assigned priority number, the two most significant bits of which are a binary 1 and 0, respectively) is driven to a true logic level signal (i.e. representative of the output signal of second arbitration stage AS-12), inasmuch as each of the input terminals of AND gate 12-5 is respectively driven to a true logic level signal.

It will be understood by those skilled in the art that each of the bits comprising the binary coded priority numbers of all of those users who compete for access to the system are successively arbitrated by respective arbitration stages AS-11, . . ., AS-15 of the present priority arbitration circuit 200. Generally, when a relatively low priority user is eliminated from further contention for the system at a particular arbitration stage, the output terminals of the NAND gates that form that respective arbitration stage are clamped to a false logic level signal via a common arbitration bus line BPR4, . . . , BPR0 and the output terminal of a NAND gate (11-1, 12-2, 13-2, 14-2, or 15-2) that forms the corresponding arbitration stage of a successful competitor. When a relatively high priority user is not eliminated from contention for access to the system at a particular arbitration stage, the respective output terminal of the AND gate 11-3, 12-5, 13-5, 14-5, or 15-5 of that stage is driven to a true logic level signal, and the arbitration process for the prospective user's assigned priority number is repeated, with those of all remaining system contenders, by a successively lower order arbitration stage via the corresponding common arbitration bus line thereof. Thus, from all of the foregoing descriptions, it is believed that the operation of the remaining arbitration stages AS-13, . . . , AS-15 of priority arbitration circuit 200 will be apparent to those skilled in the art.

As described when referring to FIG. 1, above, the particular user having the highest binary coded priority number stored in his priority register 10 during an interval in which system access is requested will be the only contender for the system who is capable of causing each of the respective output terminals of the AND gates 11-3 and 12-5, . . . , 15-5, that form successively lower order arbitration stages AS-11, . . . , AS-15, to be driven to a true logic level signal. As a result, a true logic level signal is applied to one input terminal of the successful user's output flip-flop 18 from the output terminal of the AND gate 15-5 that forms the last (i.e. lowest order) arbitration stage AS-15. Accordingly, during that time when the $CL_2$ clock signal is present at the other input terminal 20 of flip-flop 18, the output terminal 22 thereof is driven to a true logic level signal, ACKNOWLEDGE OUT, the voltage level of which is suitable to provide a successful user with the information that his assigned priority number is high enough to gain him the desired access to or interruption of a system at the present time.

As will also be recognized by those skilled in the art, the logical operations performed by the arbitration stages of priority arbitration circuit 200 of FIG. 2 are identical to those performed by the stages of arbitration circuit 100 of FIG. 1. However, by virtue of the particular parallel implementation of portions of circuit 200, the speed by which logical operations are performed thereby is maximized. More particularly, the AND gate 12-3 that forms second arbitration stage AS-12 is driven (from common electrical junction 11-4) by the same input signal that drives the NAND gate 11-1 that forms first arbitration stage AS-11. As a result, AND gate 12-3 is almost immediately responsive to the logic level signal stored by priority assignment means PR3 when a user selectively initiates a REQUEST IN signal. Moreover, the AND gates 13-3, 14-3, and 15-3, that form third, fourth, and fifth arbitration stages AS-13, . . . , AS-15 are driven from the output terminals of first, second, and third arbitration stages AS-11, . . . , AS-13 (at the output terminals of AND gates 11-3, 12-5, and 13-5), respectively. Therefore, AND gates 13-3, 14-3, and 15-3 are connected to respond rapidly to the logic level signals stored by respective priority assignment means PR2, . . . , PR0. What is more, the parallel operation of arbitration circuit NAND gates 12-1 and 12-2, 13-1 and 13-2, 14-1 and 14-2, 15-1 and 15-2 also maximizes the speed of circuit 200. That is, one NAND gate 12-2, 13-2, 14-2, and 15-2 that forms a respective arbitration stage AS-12, . . . , AS-15 is driven by the signal stored in the priority assignment means PR4, . . . , PR0 which is connected to a preceding arbitration stage AS-11, . . . , AS-14. NAND gate 11-1 and the second NAND gates 12-1, 13-1, 14-1, and 15-1 that form respective arbitration stages AS-12, . . . , AS-15 form a serial propagation path, whereby the competitor with the highest assigned priority number can receive, in a relatively short amount of time, an indication that he has successfully gained access to the system.

It will be apparent that while a preferred embodiment of the invention has been shown and described, various modifications and changes can be made without departing from the true spirit and scope of the invention. For example, either of the priority arbitration circuits 100 or 200 and the respective user priority register 10 can be mechanized in the same integrated circuit. Therefore, a priority arbitration network can be conveniently arranged on a microelectronic chip so as to consume relatively little area. Moreover, it should be recognized that each of the common arbitration bus lines BPR4, . . . , BPR0 in each of FIGS. 1 and 2 is driven to a respective logic level signal via a priority arbitration circuit 100 or 200, which signals collectively correspond to the complement of the highest assigned priority number that is stored in any of the respective user priority registers 10 during that time when access to the system is requested.

Having thus set forth a preferred embodiment of the invention, what is claimed is:

1. In a system to be shared by a plurality of users, each of which users being provided with respective priority numbers, the relative magnitudes of which numbers determining a priority order for enabling the user with the highest priority number to gain access to the system, a priority arbitration network wherein each competing user for the system has a priority arbitration circuit respectively connected between a user register means that stores signals which correspond to bits of a coded representation of the user's priority number and multi-line bus line means, said bus line means being coupled to the arbitration circuit of every user, each user priority arbitration circuit comprising:

a plurality of serially interconnected arbitration stages, at least some of said stages including at least first, second, and third signal gating means, said first signal gating means connected between said user register means and one line of said multi-line bus means, said first gating means receiving at input terminal means thereof a signal from said register means that is representative of one bit of a user's coded priority number, said one bus line being common to the first gating means of the corresponding arbitration stage of every user's arbitration circuit, said first gating means also receiving at the input terminal means thereof a command signal whereby to cause said one common bus line to be driven from output terminal means of said first signal gating means to a signal level that is representative of the corresponding one bit of the highest assigned priority number of any user, said second signal gating means having input terminal means connected to said register means and to said one bus line to receive signals therefrom, said second signal gating means comparing the magnitude of the signal level to which said one bus line is driven with the magnitude of the signal that is representative of the one bit of the user's assigned priority number, to thereby provide a particular output signal depending upon the relative magnitudes therebetween, and said third signal gating means having input terminal means connected to output terminal means of said second gating means and to output terminal means of the third gating means of a preceding arbitration stage to receive signals therefrom, said third gating means providing from output terminal means thereof a command signal to be supplied to input terminal means of each of the first and third gating means of a succeeding arbitration stage for controlling the operations thereof, the command signal provided by said third gating means having either a first signal level when the magnitude of the bit of the user's priority number is not lower than that of any corresponding bit of any other competing user or a second signal level when the magnitude of the bit of the user's priority number is lower than that of any corresponding bit of any other competing user, the third gating means of the arbitration stage, the first and second gating means of which are connected to receive a signal corresponding to the least significant bit of the highest priority number assigned among those users competing for access to the system, providing a command signal, the level of which is conditioned to selectively enable the user having the highest priority number to gain access to the system.

2. The priority arbitration network recited in claim 1, wherein each user arbitration circuit includes a control signal generating means associated therewith, said signal generating means being selectively activated by respective users who request access to said system, each signal generating means thereby applying the command signal to the first and third signal gating means of the respective user's arbitration circuit stage which receives the signal that is representative of the most significant bit of the user's priority number, said command signal acting to control the operation of each of said first and third gating means.

3. The priority arbitration network recited in claim 2, wherein said control signal generating means comprises a bistable device.

4. The priority arbitration network recited in claim 2, including clock means connected to each of the control signal generating means of each user arbitration circuit, said clock means providing synchronous control of said signal generating means, so that command signals generated thereby are concurrently applied relative to one another to respective user arbitration circuits.

5. The priority arbitration network recited in claim 1, wherein each user arbitration circuit includes an indication means associated therewith, said indication means connected to receive respective command signals provided by the third signal gating means of each user's arbitration circuit stage which receives the signal that is representative of the least significant bit of the user's priority number, said indication means providing an acknowledgement signal to each user to thereby indicate, depending upon the level of a respective command signal, whether or not the user has gained access to the system.

6. The priority arbitration network recited in claim 5, wherein said indication means comprises a bistable device.

7. The priority arbitration network recited in claim 5, including clock means connected to each of the indication means of each user arbitration circuit, said clock means providing synchronous control of every indication means, so that said acknowledgement signals are concurrently provided thereby.

8. The priority arbitration network recited in claim 1, wherein said first signal gating means includes a NAND logic gate, said second signal gating means includes an OR logic gate, and said third signal gating means includes an AND logic gate.

9. The priority arbitration network recited in claim 1, wherein said first, second and third signal gating means are interconnected so as to form a serial propagation path therebetween.

10. The priority arbitration network recited in claim 1, wherein said first signal gating means of some arbitration circuit stages includes a pair of NAND logic gates connected in parallel with respect to one another between a user register means and said one bus line from the multi-line bus.

11. The priority arbitration network recited in claim 10, wherein one of said pair of NAND logic gates of each of a user's arbitration stages are interconnected with one another so as to form a serial propagation path therebetween.

12. The priority arbitration network recited in claim 1, wherein the first signal gating means of the arbitration circuit stage that is connected to receive the signal that is representative of the most significant bit of a user's priority number comprises a NAND logic gate, and the first signal gating means of the arbitration circuit stage that is connected to receive the signal that is representative of the next most significant bit includes a pair of NAND logic gates connected in parallel with respect to one another, said first-mentioned NAND logic gate connected in parallel with one of said pair of NAND logic gates and in series with the second of said pair of NAND logic gates.

* * * * *